(12) United States Patent
Mansour et al.

(10) Patent No.: US 9,197,624 B2
(45) Date of Patent: *Nov. 24, 2015

(54) USING CLOCK DRIFT, CLOCK SKEW, AND NETWORK LATENCY TO ENHANCE MACHINE IDENTIFICATION

(71) Applicant: EBAY INC., San Jose, CA (US)

(72) Inventors: Rasta A. Mansour, San Jose, CA (US); Upendra Mardikar, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/330,405

(22) Filed: Jul. 14, 2014

(65) Prior Publication Data

US 2014/0325598 A1  Oct. 30, 2014

Related U.S. Application Data

(63) Continuation of application No. 13/397,070, filed on Dec. 15, 2012, now Pat. No. 8,789,158.

(60) Provisional application No. 61/444,015, filed on Feb. 17, 2011.

(51) Int. Cl.
| | |
|---|---|
| H04L 29/06 | (2006.01) |
| G06F 21/34 | (2013.01) |
| G06F 21/44 | (2013.01) |
| G06F 21/72 | (2013.01) |

(52) U.S. Cl.
CPC ............... *H04L 63/08* (2013.01); *G06F 21/34* (2013.01); *G06F 21/44* (2013.01); *G06F 21/725* (2013.01); *G06F 2221/2129* (2013.01)

(58) Field of Classification Search
CPC .... H04L 9/3271; H04L 9/3276; H04L 9/3278
USPC .................. 726/3, 4, 7–9, 26; 705/26, 35, 71; 382/124; 709/248
See application file for complete search history.

(56) References Cited

U.S. PATENT DOCUMENTS

| | | | |
|---|---|---|---|
| 6,947,978 | B2 | 9/2005 | Huffman et al. |
| 2006/0242103 | A1 | 10/2006 | Chavda |
| 2008/0226142 | A1 | 9/2008 | Pennella et al. |
| 2009/0184871 | A1 | 7/2009 | Tofighbakhsh |
| 2010/0004965 | A1 | 1/2010 | Eisen |
| 2010/0088747 | A1 | 4/2010 | Fink et al. |
| 2011/0082768 | A1 | 4/2011 | Eisen |

*Primary Examiner* — Izunna Okeke
*Assistant Examiner* — Hee Song
(74) *Attorney, Agent, or Firm* — Haynes and Boone, LLP

(57) ABSTRACT

Methods and systems for authenticating a user device employ a database of global network latencies categorized and searchable by location and calendar date-time of day usage, providing network latency by geography and by time. The database is constructed using voluminous daily data collected from a world-wide clientele of users who sign in to a particular website. Accuracy of the latency data and clock skew machine identification is made practical and useful for authentications using a service provider-proprietary, stable reference clock, such as an atomic clock, so that internal clock jitter of a service provider performing authentications does not affect the network latency time and clock skew identification of user devices. Increased authentication confidence results from using the database for correcting network latency times and user device signatures generated from the clock skew identifications and for cross checking the authentication using comparisons of initial registration to current sign in data.

20 Claims, 2 Drawing Sheets

USING CLOCK DRIFT, CLOCK SKEW, AND NETWORK LATENCY TO ENHANCE MACHINE IDENTIFICATION

CROSS REFERENCES TO RELATED APPLICATIONS

This application is a continuation of co-pending U.S. patent application Ser. No. 13/397,070, filed Feb. 15, 2012, and claims benefit of priority from U.S. Provisional Patent Application No. 61/444,015, filed Feb. 17, 2011, both of which are incorporated by reference.

BACKGROUND

1. Technical Field

Embodiments of the present invention generally relate to authenticating a user and a consumer electronic device for purposes of communications needing security, such as purchases and financial transactions and, more particularly, to enhancing authentication of the device using methods of machine identification based on clock timing and network latency.

2. Related Art

Using online financial transactions, customers may search for and purchase products and services from merchants. For online shopping, transactions may be conducted through electronic communications with online merchants over electronic networks. A variety of electronic devices and various electronic techniques may be used to conduct such electronic transactions. Methods of initiating or making financial transactions from an electronic device include, for example, SMS (Short Message Service), radio frequency identification (RFID) or near field communication (NFC) at a point-of-sale (POS), and mobile Internet-based payments, by which customers search for and purchase products and services through electronic communications with online merchants over electronic networks such as the Internet.

When conducting secure communications, such as financial transactions, via any kind of consumer electronic device (CED), security is generally an issue in that the data transferred may typically include credit card and financial instrument information such as a user name, account number, a PIN, or a password, for example, that are susceptible to abuse such as theft or malicious attack. Thus, a central issue with consumer electronic devices—such as a personal computer (PC), a laptop, mobile phone, NFC enabled mobile device, for example, or other CEDs—is the need for authentication of the device and its user for secure communications. Authentication is a fundamentally difficult and important problem to solve. Authentication is based, first, on identification. Identification may be based on identifying materials that an entity presents to establish who an entity is (e.g., an identification (ID) card with a picture or other device for identifying the entity). In the case of a consumer electronic device, identification may be aided by various attributes of the device such as a unique subscriber identity module (SIM) card ID or international mobile equipment identity (IMEI) number embedded in the device, for example.

Such presenting of identifying materials to establish identity is usually called an "identity claim," Subsequent to identification comes authentication. Authentication usually includes a process of proving whether the identity claim asserted by the identified entity is true or not. For comparison, identification may include the "presentation" of identification material, whereas authentication is the assertion—the act that happens—usually in the form of verification. For the ID card picture example, the authenticator may compare the ID card picture to the appearance of the person presenting the ID card, and if the appearance matches the picture to the authenticator's satisfaction, authentication may be granted and otherwise either not granted or alternative authentication required.

SUMMARY

According to one or more embodiments of the present invention, methods and systems for authenticating a user device and its user, who communicates via the user device through a network (which may include the Internet) with service providers (including, for example, financial service providers, merchants, and banks), and various commercial entities (including, for example, a merchant and a bank) employ user device signatures generated by sampling clock skews of user devices and correcting for network latency. Corrections for network latency by geography and scheduling aspects are provided from a database of network latencies mapped by geography and scheduling aspects and collected from large volumes of user data. Increased confidence results from authentication using the user device signatures, user identity determined from user identity material, database mapping of user device signatures to user identities, and comparison of a user device's particular network latency to network latency for the network relative to the server mapped by geography and scheduling aspects.

In one or more embodiments, a system includes: a server configured to communicate with a user device via a network; a reference clock in communication with the server for providing accurate time signals to the server; and a database accessible to the server and providing: network latencies for the network relative to the server mapped by geography and scheduling aspects; and user device signatures mapped to user identities. The server is configured for authenticating the user device by a network latency and a clock skew signature from the user device, the authentication using the user device signatures, the user identities, the database mapping of user device signatures to user identities, and the network latencies for the network relative to the server mapped by geography and scheduling aspects.

In another embodiment, a method is disclosed for authenticating a user device acting as a client and communicating with a server via a network. The method includes: building a database of user device signatures and network latencies relative to the server, in which: the user device signatures are mapped in the database to user identities; the network latencies are mapped in the database by geography; and the network latencies are mapped in the database by scheduling aspects; initially authenticating the user device by presentation of user identity material, wherein the user identity material is sufficient to determine a user identity in the database; and authenticating the user device by a current network latency and a current user device signature from the user device, wherein the authentication uses the user device signatures, the user identity determined from the user identity material, the database mapping of user device signatures to user identities, and the network latencies for the network relative to the server mapped by geography and scheduling aspects.

In a further embodiment, a computer program product comprises a computer readable medium having computer readable and executable code for instructing a processor to perform a method that includes: building a database of user device signatures and network latencies relative to the server, wherein: the user device signatures are mapped in the database to user identities; the network latencies are mapped in the database by geography; and the network latencies are mapped in the database by scheduling aspects; initially authenticating the user device by presentation of user identity material, wherein the user identity material is sufficient to determine a user identity in the database; and authenticating the user device by a current network latency and a current user device signature from the user device, wherein the authentication uses the user device signatures, the user identity determined from the user identity material, the database mapping of user device signatures to user identities, and the network latencies for the network relative to the server mapped by geography and scheduling aspects.

DETAILED DESCRIPTION

Figure 1:
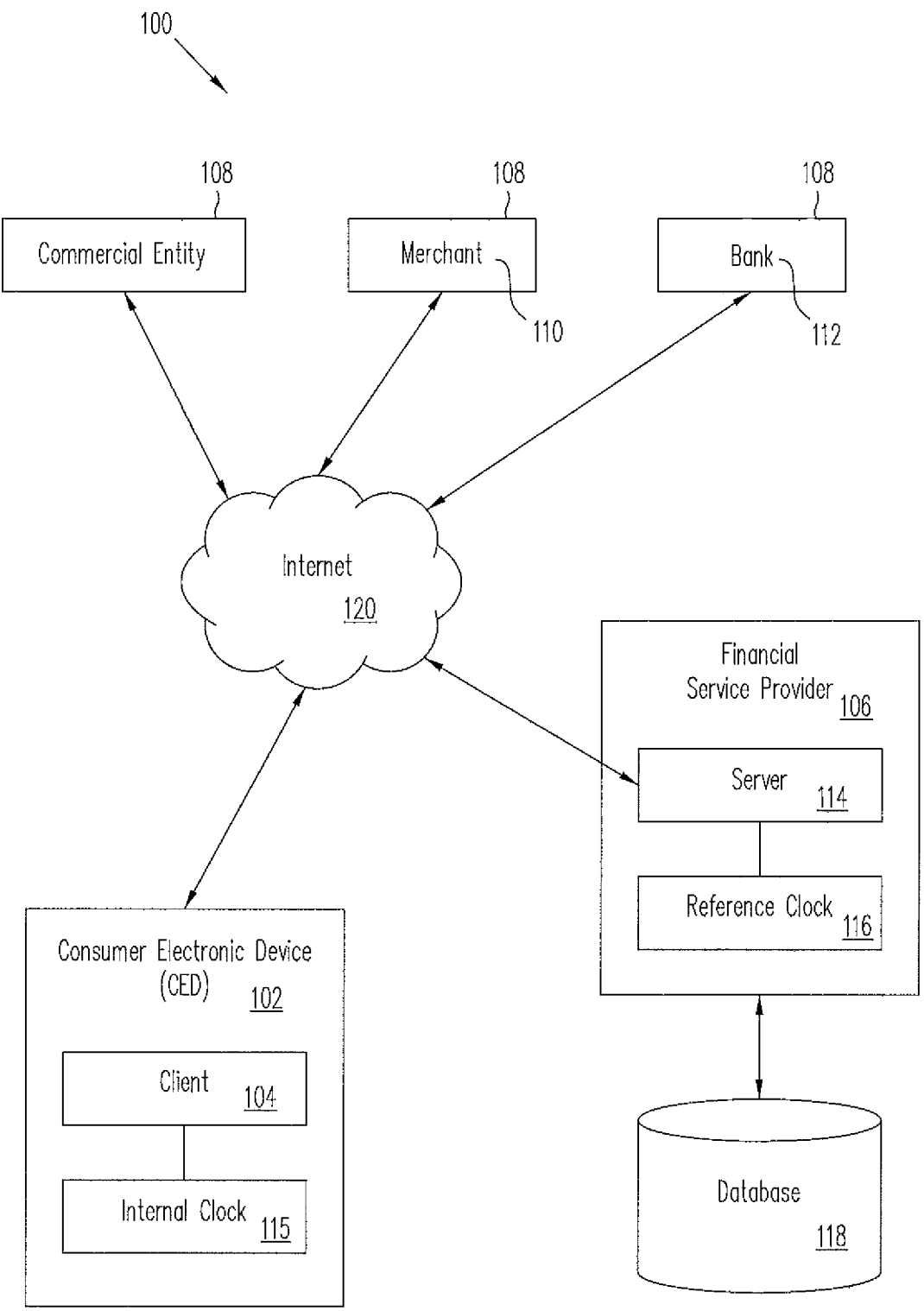
FIG. 1 is a system diagram illustrating a system for providing communications between users (e.g. via a user device), service providers (including a financial service provider, merchant, and bank), and various commercial entities (including, for example, a merchant and a bank) via a network in accordance with an embodiment of the present invention.

Embodiments of the present invention relate to providing more reliable authentication of a user attempting to access a user account with a service provider, such as an online user signing in to a website or a person conducting a financial transaction with a bank or merchant via a consumer electronic device (CED). In one or more embodiments, an authentication process may be enhanced by establishing and verifying an identification of the user's device that originates from intrinsic characteristics of the device's hardware, such as clock skew, and from other user-dependent characteristics, such as network latency and usage schedule (e.g., time-of-day, day-of-week that sign-in is occurring). In some embodiments, identification of the user device may be facilitated by a standard reference clock, e.g., a proprietary, highly accurate, single source of time signals, and by an extensive database of user clock skew and network latency information, which may be acquired, for example, from a large user clientele that is geographically widely distributed.

Embodiments generally may be used to address a business problem of potentially huge liability issues incurred from identity theft and other forms of fraud. For example, a provider of on-line auction sales may have a user clientele that produces on the order of 100 million sign-ins per day, including both returning users and new registrations. Without a reliable method or mechanism for determining whether the people who sign in are the persons they claim to be, the provider may incur significant expenses, for example, for protection against or indemnity of business liabilities for fraudulent transactions, e.g., identity theft in the form of account take-over and fraudulent purchases, which may run, in the case of a service provider with 100 million sign-ins per day, in the hundreds of millions of dollars. Alternatively or in addition, the same service provider may incur expenses running in the tens of millions of dollars for operating customer service or trust and safety organizations, which may, for example, deal with fraud claims, e.g., for account take-overs, and refund requests, and associated forensic activities involved in determining whether each claim is valid or invalid.

Thus, by addressing problems of authentication and verifying machine or device identity, embodiments may provide business value by increasing the confidence in each user authentication which allows an authenticating service provider to determine, based on the level of certainty provided, the level of privileges the service provider may want to associate with the authenticated user in terms, for example, of what that user can do on the service provider's website. If the confidence or level of certainty of authentication is low, the authenticating service provider can trigger re-authentication of that user by asking the user more questions, for example. Embodiments may provide additional value by re-authenticating based on the confidence level as opposed to re-authenticating in a more indiscriminate manner which may create friction with the user clientele. Thus, embodiments may provide important cost savings and other value for providers of services, e.g., commercial services like the auction sales in the example given above or financial services like providing payments for sales transactions.

A conventional process for user authentication from a user device may request the user to enter a username and corresponding password, which the service provider can compare with entries in a database maintained by the service provider (also referred to as "authenticator"). Upon finding that username and password matches entries in the database the service provider may then allow the user access, for example, to the service providers website based on a privilege level granted to the user or allow the user to perform various actions in a user account.

An augmentation to the authentication process may be made by using the internet protocol (IP) address of the user's device and comparing that IP address to ones previously stored corresponding to that user in the authenticator's database. Using the IP address for authentication, however, may be susceptible to weakness because an attacker can spoof or change the IP address "in flight", that is, set the attacker's IP address to that of the machine of the account owner in an attempt to take over an account by pretending to be its owner. Part of the weakness stems from the fact that an attacker who is able to capture an account owner's username and password can generally capture the IP address at the same time. But, more importantly, with network packets going over the network, the IP address can be changed—at the network level, not even at the server level—by the attacker's putting a simple filter in the attacker's TCP/IP stack to change the IP address as the packets go out, which is effective because the switches and routers on the internet don't validate where the IP packets come from but simply trust them as is.

Another augmentation to the authentication process may be made by tagging the user's device by dropping a cookie on it. The cookie may contain encrypted data such that if the authenticator queries a user device, and it has an encrypted cookie on it, and the authenticator can decrypt the cookie, and the authenticator can see the same username on the decrypted cookie as the one who claims to be logging on to the authenticator's—e.g., service provider's—service, then the user's device is judged to be the same machine the user previously used to register, and therefore the chances of that user having been compromised are considered to be very small. This process and a user device successfully identified by such a process are termed "known good" meaning that the authenticator trusts that the machine identification is good as a result of having been done through cookie tagging. Usefulness of the "known good" process may be illustrated by an example in which a service provider, being subpoenaed into court in a case of several thousand dollars worth of liability that a user is contesting, provides a reference document that states the communication must have come from this same user because the encrypted cookie matched, i.e., the service provider found it on the same machine as the machine that the person (user) used to register with the service provider previously.

One weakness with cookie tagging is that some people turn off cookies—so the authenticator can not write the cookie required to register the user's device in some cases—thus defeating the cookie tagging or "known good" process. Another weakness is that some new devices—such as some of the new phones and electronic notepads—do not accept cookies, e.g., do not physically accept a cookie from a service provider because the phone, as a protective feature, may not allow cookies to be dropped on it; thus also defeating the cookie tagging or "known good" process. Yet another weakness is that cookies often produce a false positive, i.e., authentication failure, for example, because the user registers on one device but may have several such devices so that the registered device is not the only one used and the device being used does not contain the "known good" cookie, or for example, because the user occasionally flushes out the browser cache on the user device which also flushes cookies, thereby deleting the "known good" cookie.

While the above approaches to authentication may partially solve the business problems described above, embodiments may provide a solution that is additive to the above approaches. In other words, embodiments may provide a separate way to get another factor about the identity of the user, and if that factor is different from the other ones, the authenticator may either trust that factor or trust the other factors, and either way more indicators are provided with which to determine the level of trust granted to that user who has signed in.

FIG. 1 illustrates a system 100 for providing communications between users (e.g. via a user device 102), service providers (e.g., financial service provider 106, merchant 110, bank 112), and various commercial entities 108 (including, for example, merchant 110 and bank 112) via a network 120, which may, for example, comprise the Internet. User device 102 may include software so that user device 102 may act as a client 104 when communicating with servers connected to network 120. Service provider 106 may operate a server 114 connected to network 120. Client 104 may execute a browser, for example, that connects to server 114 allowing a user of user device 102 to view a website offered by service provider 106. Service provider 106 may maintain an accurate reference clock 116, which may, for example, include an atomic clock. Service provider 106 may also maintain a database 118 of information derived from contacts with its user clientele (through user devices 102 or client devices 104) via network 120.

User device 102 may be any consumer electronic device (CED) that can be used for network communication including mobile phones, personal digital assistants, laptop and personal computers. User device 102 may include an internal clock 115 which may be used for internal synchronization, for example, and for providing timestamps on network packets that user device 102 places on network 120 when communicating with other entities on network 120, such as service provider 106. Internal clock 115 may be subject to clock drift and clock skew, and communications from user device 102 over network 120 may be subject to varying network latency. The clock skew of internal clock 115 (also referred to as skew of user device 102) and network latency of user device 102 may be measured by service provider 106 using reference clock 116. Measurement may be performed, for example, by server 114 using a time signal from reference clock 116 that is communicated directly to server 114, e.g., without the time signal traversing any part of network 120 to get from reference clock 116 to server 114.

Clock drift generally refers to phenomena in which a clock does not run at the exact same speed compared to another clock so that, even if initially synchronized, after some time the one clock "drifts" from the other clock so that the clocks are no longer synchronized. Clock drift may be due, for example, to variations in manufacturing process. Clock drift for a particular clock may vary depending on design, power supply variations, surrounding temperature, and other environmental variables. Thus, the same clock may, at different times, have a different clock drift compared to another clock. A clock skew may be described as a rate of clock drift and may be measured from clock drift using, for example, linear programming method (LPM) or least squares fit (LSF) methods.

It has been shown to be possible to use clock skews due to microscopic deviations in device hardware to provide identification of devices that are unique to each device so as to be considered a "fingerprint" of the device. It has also been shown to be possible to remotely measure the microscopic clock skews of devices, and that the clock skew fingerprinting could identify individual devices despite errors inherent in remote measurements. For example, measurement of clock skews in wide-area networks may be made by observing timestamps in TCP and ICMP packets. For wireless devices, observations may be made at the MAC (media access control) layer of 802.11 networks. Such machine identification may not require modification to the user device 102 and may be applied to user devices 102 whether the authenticator (e.g., service provider 106) is thousands of miles, multiple network hops, and tens of milliseconds away from the fingerprinted user device 102, and whether the fingerprinted user device 102 is connected (e.g., reconnected) to the Internet from different locations and via different access technologies, and, moreover, whether the fingerprinted user device 102 is behind a network address translation (NAT) or firewall, and also whether the user device's system time is maintained via network time protocol (NTP) or simple network time protocol (SNTP). For example, when communicating with a user device 102, service provider 106 may execute a javascript on server 114 that can get the machine timestamp (e.g., from network packets sent by user device 102) of user device 102 along with a current machine identification, such as IMEI number or IP address of user device 102. Using the timestamps and fingerprinting techniques, service provider 106 may generate a signature of the user device 102 that can be used to identify user device 102 and associate each user device 102 uniquely to a user or a user account. For example, database 118 may be used to store user device signatures, user identities, and user account identifications and provide database mappings between them so that, for example, a corresponding user identity and user account identification can be found for a given particular user device signature. Conversely, a given particular user identity and particular user device signature may be checked against a stored user device signature associated with the matching user identity in the database 118, the database association having been generated during the course of a user registration process, to authenticate a user device 102 using, for example, "known good" techniques.

The timestamp of a user device 102 may also be used to determine the network latency for user device 102 depending, for example on where, geographically, e.g., Europe, Asia, North America, user device 102 is currently connected to network 120 and what time and day the communication is taking place. Latency in a packet-switched network may be measured either one-way (the time from the source sending a packet to the destination receiving it), or round-trip (the one-way latency from source to destination plus the one-way latency from the destination back to the source). Round-trip latency has an advantage that it can be measured from a single point. Network latency between service provider 106 and user device 102 may vary depending on geography, e.g., the location of user device 102 relative to that of service provider 106 as between a user device 102 in one city or continent and a different user device 102 in another city or on a different continent or if the same user device 102 is moved from one place to another. Network latency between service provider 106 and user device 102 also may vary depending on calendar and time-of-day variations (also referred to as "schedule variations") according to when the latency is measured. For example, latency at 2:00 am in the local time zone of user device 102 may differ from latency at 9:00 am the same day—due, e.g., if it is a work day to people conducting more business at mid-morning than the middle of the night and similarly, workday latency may differ from weekend latency, and holiday latency may differ from both, all by way of example.

A service provider 106 with a very large clientele that is geographically widely distributed may be able to build an extensive database 118 of network latencies categorized by geographic and schedule variations. Such a database may be able to answer a query such as "what is the expected network latency for a user device 102 in Paris, France, at 6:57 am on Easter Sunday?", for example. The answer to such a query then may combined, for example, with the particular user device signature generated from a current call and user device signature information, user identity information, user account information, and other information associated with user identities and user device signatures in the database 118—such as whether this particular user typically communicates from Paris; or whether communication from Paris is unusual or suspicious for the particular user; or whether the network latency, if not matching that expected for Paris at 6:57 am on Easter Sunday, casts any aspersions for authentication—using database mappings constructed previously (e.g., from client communications and registrations) to help authenticate a user device 102 and the user of the device.

In order for database 118 to be used effectively in this manner—e.g., for database 118 to contain statistically reliable mappings of network latency by schedule (e.g., time-of-day, day-of-week, calendar date), geography (e.g., geographical location of user device 102 anywhere in the world) and user device signature—database 118 may be constructed on the basis of client communications and user device 102 sign-ins and registrations with service provider 106 that, collectively, may number in the millions to hundreds of millions on a daily basis. In addition, in order for database 118 to be used effectively in this manner, database 118 may be maintained and accessed by a processor, e.g., server 114, placed in direct communication (e.g., not using network 120) with an atomic reference clock, e.g., reference clock 116.

Figure 2:
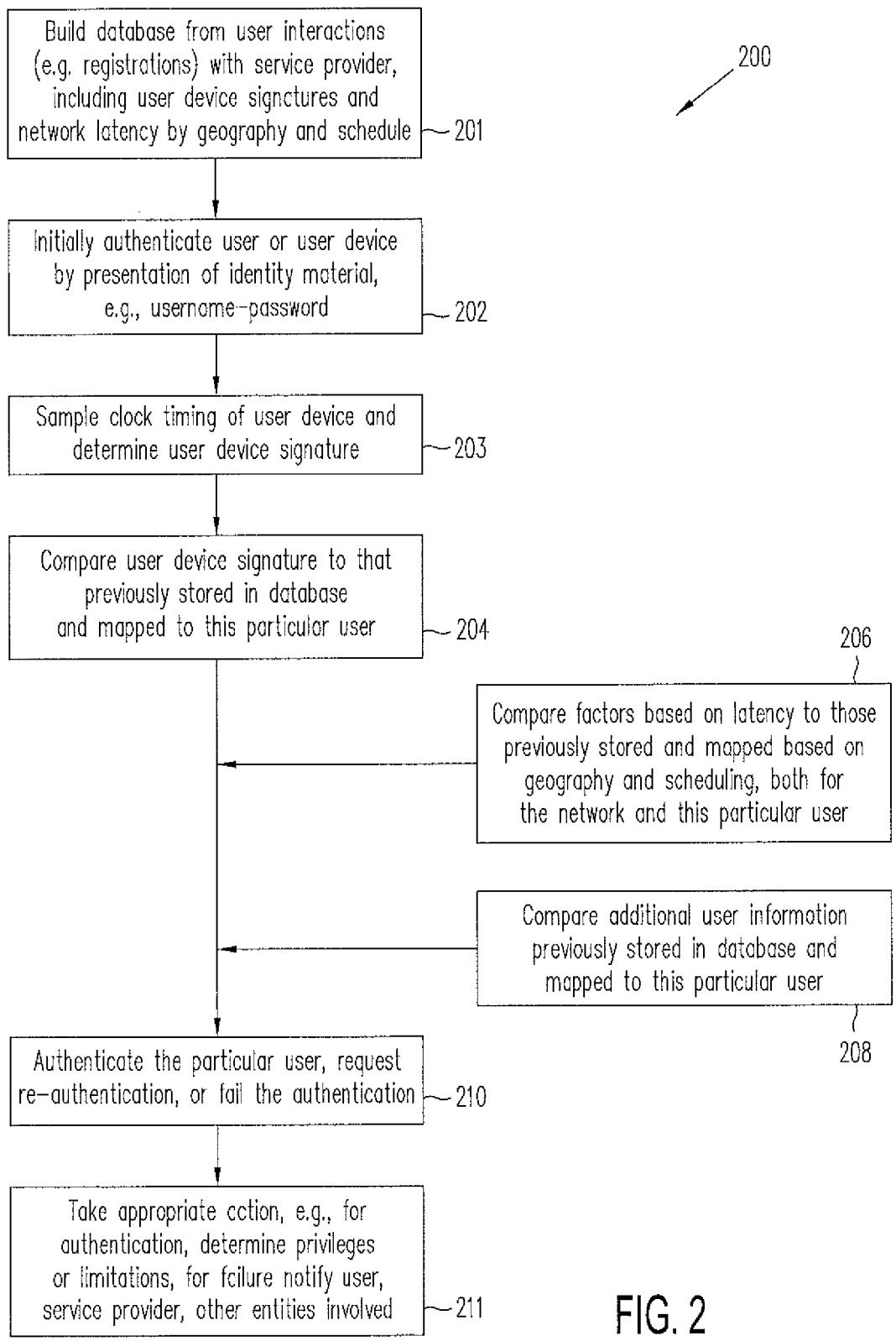
FIG. 2 is a flow chart illustrating a method for authenticating a user device and its user, who communicate through a network with service providers (including, for example, financial service providers, merchants, and banks), and various commercial entities (including, for example, a merchant and a bank) in accordance with an embodiment.

FIG. 2 illustrates a method 200 for authenticating a user device (e.g., user device 102, see FIG. 1) and its user, who communicates via the user device through a network (e.g., network 120, which may include the Internet, see FIG. 1) with service providers (e.g., financial service provider 106, merchant 110, bank 112), and various commercial entities 108 (including, for example, merchant 110 and bank 112).

Method 200 may include a step 201 for building a database (e.g., database 118). A worldwide network latency and user device signature database, for example, may be built from user interactions (e.g. registrations) with a service provider (e.g., service provider 106) and may include user device signatures and network latency that can be queried by geography and schedule (e.g., calendar day and time of day).

According to the method 200, a processor (e.g. server 114) may sample the clock drift on a machine (e.g., user device 102) and generate a unique signature from that such that if the user subsequently signs in (e.g., to service provider 106) as a particular user, and if the signature that is generated by virtue of that subsequently sampled clock drift matches the user identity of that particular user (e.g., the service provider 106 has already sampled, stored, and mapped that particular drift for that particular user) then the authenticator's confidence in the user identification is increased and the authentication process can go forward. On the other hand if the signature that is generated by virtue of that subsequently sampled clock drift is different from what is stored in and mapped by the database to the particular user, then the authenticator's confidence is lowered. The authenticator (e.g., service provider 106 or any of commercial entities 108) may wish to take appropriate measures to either re-authenticate the user or re-verify the user by asking them more questions in accordance with, for example, step 211 of method 200.

Collecting the clock drift on the machine (e.g., user device 102) by itself, however, may be of no value, because transmitting that clock drift over the network (e.g., network 120) with the delays that are inherent in the network transfer, may affect the skew (for example, producing an effect known as clock jitter) in the clock of the machine so much that the precision of that data itself may become very questionable. For example, if a drift that is of the order of seconds relative to a reference clock has been sampled and it takes a transfer time over the network that is also of the order of seconds to get this information to the source, then the confidence in that data may drop significantly.

A solution to these problems may be provided, however, in accordance with one or more embodiments, as follows. First, an extremely accurate reference clock (e.g., what is generally known as an atomic clock) such as reference clock 116 may be provided for all sampling of clock drifts both in building and subsequently using database 118. For example, a reference clock may provided in accordance with that of a service provide of on-line auctions, which has solved a problem relevant to auctions in that on-line auctions have to end at a set time regardless of where the clients (e.g., client 104) are on the Internet. For example, whether in China, Brazil, or North America, everyone should see the same exact auction end time, because the on-line auction service provider needs that in order to claim that the auction was satisfactorily closed.

An additional factor in the solution, which may be dependent on the reference clock just described, may be provided by sampling network delay times of a large volume of users, scattered across the globe, who are consistently using the website of a service provider (e.g., service provider 106) on a daily basis. A service provider having such a large volume of users (e.g., providing daily website "hits" that may be numbered upwards of millions) may place such a service provider in a favored position to create a database of reference network delay times as perceived from different geographies and different scheduling aspects relative to the service provider. For example, at 10 o'clock in the morning in California the builder of the database (e.g., service provider 106 using reference clock 116 to build database 118) would measure a different network delay time than at 2 o'clock in the morning (in California), because, for example, people have arrived at work, they are engaging their friends or business partners all through email, and they are browsing the web so traffic volume on the web has increased significantly, and therefore the latency on the web (for California) has increased. While, conversely, at 2 o'clock in the morning, many people have gone to bed so traffic volumes would have dropped quite a bit, and the measured latency (delay time) may be much smaller.

A large-volume provider of services on-line—such as an auction provider already having an auction engine and hundreds of millions of people actively visiting its website on a daily basis—may be in a favored position to collect data which would allow that service provider (e.g., service provider 106) to build a reference database (e.g. database 118) of network latency by time of day, for example, day of the week, week of the month (referred to as "scheduling aspects") and by geography because it can be known by virtue of their registration whether the users are sitting in, for example, Germany or Miami. Such a database need not be a gigantic database. For example, a database with approximately 100,000 entries may be sufficient to achieve adequate accuracy of user device signatures to provide a reasonable and useful level of confidence in user identification for authentication purposes.

Thus, using the reference clock and correction of data for network latency time by geography and scheduling aspects, the database builder, service provider, or authenticator may be able to distill or separate out the machine (e.g., user device 102) clock skew or drift from the total elapsed time including network latency of a network packet containing a timestamp, e.g., from the time the server requests that the skew be sent to the server to the time the server actually sees (e.g., can measure) the skew.

Method 200 may include a step 202 for initially authenticating the user or user device, for example, by presentation of user identity material—such as a username, password, IP address, or cookie. For example, a user may sign in to a website of an authenticator, e.g., service provider 106 or a commercial entity 108 including merchants 110 and banks 112—using a username and password. Once the user signs in and other machine identification fraud checks are passed for the first time, the timestamp (e.g., on network packets sent from user device 102) may be compared with the service provider's reference clock, e.g., an atomic reference clock 116 of service provider 106. Machine (user device) identification for initial authentication may employ various techniques such as using an IP address of the user device, or placing some token, e.g., cookie, on the machine that has been tagged with the machine identity.

Also, for example, during a browser session, the client (e.g., client 104) application (e.g., browser) or server side (e.g., server 114) may validate to make sure the user device (e.g., user device 102) is a known machine (e.g., using "known good" techniques) and if it is and the user is the same user associated with that machine, then the level of confidence in the initial authentication and identity verification process may increase. If, on the other hand, the machine is not a known machine or the user is using a machine that has been tagged by someone else, then there may be less confidence, and the sign in may be potentially judged to be an account takeover attempt.

Method 200 may include a step 203 for sampling clock timing of the user device and determining a user device signature for the user device (e.g., user device 102).

For example, if the service provider 106, on the server side (e.g., server 114) requests the clock drift (e.g., of internal clock 115) of the client 104 to be sent to service provider 106 so that service provider 106 can validate whether that clock drift corresponds with the user of user device 102, service provider 106 may, from the snapshot timestamp (provided, e.g., on a network packet sent from client 104 to server 114), see a 3.57 second delay. But, then service provider 106 may know from network latency times from the database 118 of network latency times built and maintained by service provider 106 and the database mapping of network latencies for the network relative to the server mapped by geography and scheduling aspects that 2.75 seconds of that, at that point in time for that geography, is network latency on average. So therefore, service provider 106 may subtract that 2.75 seconds and the result may be on the order of 0.82 seconds, which service provider 106 may use as a signature for that user device, both for initial registration of the user and user device and for subsequent authentication of the user and user device.

For registration of the user and user device, for example, the newly generated user device signature, an initial user device signature, may be mapped in database 118 to a user identity—such as a username, password, or account number—that corresponds to the user. Other user device identifiers—such as IP address and IMEI number—and user identification material to be presented for initial authentication may also be mapped to the same user identity that corresponds to the user.

Method 200 may include a step 204 for comparing a user device signature to that previously stored in the database and mapped to a particular user that has signed in or initially authenticated. Also, method 200 may include a step 206 for comparing factors based on latency to those previously stored and mapped based on geography and scheduling, both for the network and the particular user.

For example, after generating a current user device signature when the user signs in using user device 102, service provider 106 may then look at database 118 for information about that user via the mapping of user devices and user device signatures to user identities. The information about that user may include additional information mapped to the user identity by geography and scheduling aspects, for example. Thus, service provider 106 may find information in database 118 about where the user is expected to be located, and therefore whether service provider 106 may have seen the user's 0.82 clock latency before (continuing with the specifics from the previous example). If service provider 106 has seen the user's signature, before, or it's in a plus-minus range of some small amount of clock skew, then service provider 106 may judge that the user is the same person, the user device 102 is the same machine, and may then validate other factors such as IP address and increase the confidence of the service provider 106 (or other authenticator) in the authentication. Conversely, if the authenticator sees a substantially different skew, it may be either because the machine has physically changed (e.g., the chances of getting the clock on a changed machine to be exactly in synchronization with the previous clock may be infinitesimal) or the user is communicating from a different location from where the user has signed in (e.g., the user usually signs in from Irvine, Calif. and now, all of the sudden, the user signature seen by service provider 106 is more consistent with some place in Romania, for example). So, using the various factors in evaluation, and because the latency jitter is no longer matching what is expected on the basis of the various factors, service provider 106 (or other authenticator) may mark the session as a candidate for further verification.

Method 200 may include a step 208 for comparing additional user information previously stored in database and mapped to this particular user. The additional information may be based on geography and scheduling aspects, as described in the above example. The additional information may also include other factors such as buying habits, for example. And then depending on other business factors, such as if the person signs in on a site and starts buying a $5,000 item, and if a red flag is already up on the person, that may be an immediate trigger to re-authenticate the person, e.g., the user and the user device 102.

Method 200 may include a step 210 for authenticating a particular user, requesting re-authentication for the particular user, or failing the authentication. Authentication may succeed, for example, for a particular user who has signed in and for which a current user device signature has been generated and compared to an initial user device signature previously generated and mapped in the database to a user identity corresponding to the particular user.

Method 200 may include a step 211 for taking appropriate action based on whether authentication has succeeded, re-authentication has been requested, or authentication has failed. For example, in case authentication has succeeded, the authenticator may accord privileges or limitations which have previously been set for the user or which may vary according to evaluation of particular factors observed in the present session, such as sign in from an unexpected location for the particular user. Other appropriate actions may be taken in the cases that re-authentication has been requested or authentication has failed. For example, for authentication failure, the authenticator may notify the user, the service provider, and other entities involved.

If there is consistency, then the chances may be very high that the user is the same user. If there is inconsistency then chances may be very high that the user needs to be re-authenticated—the user may be the same user, but the authenticator can raise a flag on the user and then watch the rest of the user's activity, and if the rest of their activity also raises a flag then the authenticator may, for example, re-authenticate the user.

In implementation of the various embodiments, embodiments of the invention may comprise a personal computing device, such as a personal computer, laptop, PDA, cellular phone or other personal computing or communication devices. The payment provider system may comprise a network computing device, such as a server or a plurality of servers, computers, or processors, combined to define a computer system or network to provide the payment services provided by a payment provider system.

In this regard, a computer system may include a bus or other communication mechanism for communicating information, which interconnects subsystems and components, such as processing component (e.g., processor, micro-controller, digital signal processor (DSP), etc.), system memory component (e.g., RAM), static storage component (e.g., ROM), disk drive component (e.g., magnetic or optical), network interface component (e.g., modem or Ethernet card), display component (e.g., CRT or LCD), input component (e.g., keyboard or keypad), and/or cursor control component (e.g., mouse or trackball). In one embodiment, disk drive component may comprise a database having one or more disk drive components.

The computer system may perform specific operations by processor and executing one or more sequences of one or more instructions contained in a system memory component. Such instructions may be read into the system memory component from another computer readable medium, such as static storage component or disk drive component. In other embodiments, hard-wired circuitry may be used in place of or in combination with software instructions to implement the invention.

Logic may be encoded in a computer readable and executable medium, which may refer to any medium that participates in providing instructions to the processor for execution. Such a medium may take many forms, including but not limited to, non-volatile media, volatile media, and transmission media. In various implementations, non-volatile media includes optical or magnetic disks, such as disk drive component, volatile media includes dynamic memory, such as system memory component, and transmission media includes coaxial cables, copper wire, and fiber optics, including wires that comprise bus. In one example, transmission media may take the form of acoustic or light waves, such as those generated during radio wave and infrared data communications.

Some common forms of computer readable and executable media include, for example, floppy disk, flexible disk, hard disk, magnetic tape, any other magnetic medium, CD-ROM, any other optical medium, punch cards, paper tape, any other physical medium with patterns of holes, RAM, ROM, EPROM, FLASH-EPROM, any other memory chip or cartridge, carrier wave, or any other medium from which a computer is adapted.

In various embodiments, execution of instruction sequences for practicing the invention may be performed by a computer system. In various other embodiments, a plurality of computer systems coupled by communication link (e.g., LAN, WLAN, PTSN, or various other wired or wireless networks) may perform instruction sequences to practice the invention in coordination with one another.

Computer system may transmit and receive messages, data, information and instructions, including one or more programs (i.e., application code) through communication link and communication interface. Received program code may be executed by processor as received and/or stored in disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable and executable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure. Having thus described various example embodiments of the disclosure, persons of ordinary skill in the art will recognize that changes may be made in form and detail without departing from the scope of the invention. Thus, the invention is limited only by the claims.

What is claimed is:

1. A method for authenticating a user device that acts as a client communicating with a server via a network, the method comprising:
    accessing a correspondence of a plurality of network latency based user device signatures to user identities in a database;
    comparing a geography information mapped to a user identity determined from a user identity material;
    accessing a correspondence of a plurality of network latencies mapped by geography, by the scheduling aspects for the network, and by the scheduling aspects for particular user devices to user identities in the database;
    comparing a current network latency of the user device to the plurality of network latencies mapped in the database by geography, scheduling aspects for the network, and scheduling aspects for particular user devices;
    authenticating the user device from a current user device signature of the user device and the current network latency of the user device based on the correspondence of the user device signatures to user identities in the database and the correspondence of the network latencies mapped by geography, by the scheduling aspects for the network, and by the scheduling aspects for particular user devices to user identities in the database; and
    increasing a confidence in the authentication if the current network latency from a location of the user device is consistent with the network latency for the location mapped in the database by geography and the location is consistent with the geography information mapped in the database to the user identity determined from the user identity material.

2. The method of claim 1, further comprising providing the correspondence of the plurality of network latency based user device signatures to user identities in the database, including:
    generating the plurality of latency based user device signatures by sampling clock skews of a plurality of user devices and correcting for network latency using corrections for network latency provided from a network latency database of network latencies mapped by geography, by the scheduling aspects for the network, and by the scheduling aspects for particular user devices.

3. The method of claim 1, further comprising:
    building a network latency database of network latencies relative to the server, including:
    collecting network latencies from a plurality of user devices; and
    mapping the network latencies in the network latency database by geography and scheduling aspects, the scheduling aspects including scheduling aspects for the network and scheduling aspects for particular user devices.

4. The method of claim 1, further comprising:
    registering the user device by presentation of a user identity material, wherein the user identity material is sufficient to determine a user identity in the database.

5. The method of claim 1, further comprising providing the correspondence of the plurality of network latencies to user identities in the database, including:
    mapping geography, scheduling aspects for the network, and scheduling aspects for particular user devices, collected from the particular user devices, to user identities, each user identity determined from a user identity material, in the database.

6. The method of claim 1, further comprising:
    building a network latency database of network latencies relative to the server, including:
    collecting user identity material from a plurality of user devices; and
    mapping the user identity material in the network latency database by geography and scheduling aspects, the scheduling aspects including scheduling aspects for the network and scheduling aspects for particular user devices.

7. The method of clam 1, further comprising:
    correcting the clock skews for network latency based on the mapping of the network latencies by geography, scheduling aspects for the network, and scheduling aspects for particular user devices; and
    generating user device signatures based on the corrected clock skews.

8. The method of clam 1, further comprising:
    initially authenticating the user device from the current user device signature of the user device and the current network latency of the user device along with a presentation of a user identity material.

9. A system comprising:
    a server in communication with a user device via a network;
    a reference clock in communication with the server for providing accurate time signals to the server; and
    a database accessible to the server and providing:
        a correspondence of a plurality of network latency based user device signatures to user identities in a database;
        a correspondence of a plurality of network latencies mapped by geography, by the scheduling aspects for the network, and by the scheduling aspects for particular user devices to user device signatures in the database;
    wherein the server comprises a processor and a data storage device including instructions which, in response to execution by the processor, cause the processor to perform a method comprising:
    comparing a current network latency of the user device to the plurality of network latencies mapped in the database by geography, scheduling aspects for the network, and scheduling aspects for particular user devices;
    comparing a geography information mapped to the user identity determined from a user identity material;
    authenticating the user device from a current user device signature of the user device and the current network latency of the user device based on the correspondence of the user device signatures to user identities in the database and the correspondence of the network latencies mapped by geography, by the scheduling aspects for the network, and by the scheduling aspects for particular user devices to user device signatures in the database; and
    increasing a confidence in the authentication if the current network latency from a location of the user device matches the network latency for the location mapped in the database by geography and the location matches the geography information mapped in the database to the user identity determined from the user identity material.

10. The system of claim 9, wherein the method further comprises:
    collecting network latencies from a plurality of user devices; and mapping the network latencies in the database by geography and scheduling aspects, the scheduling aspects including scheduling aspects for the network and scheduling aspects for particular user devices.

11. The system of claim 9, wherein the method further comprises:
collecting user identity material from a plurality of user devices; and
mapping the user identity material in the network latency database by geography and scheduling aspects, the scheduling aspects including scheduling aspects for the network and scheduling aspects for particular user devices.

12. The system of claim 9, wherein the method further comprises:
collecting clock skews from a plurality of user devices;
collecting network latencies from a plurality of user devices;
mapping the network latencies in the database by geography and scheduling aspects, the scheduling aspects including scheduling aspects for the network and scheduling aspects for particular user devices;
correcting the clock skews for network latency based on the mapping of the network latencies by geography, scheduling aspects for the network, and scheduling aspects for particular user devices;
generating user device signatures based on the corrected clock skews.

13. The system of claim 9, wherein the method further comprises:
registering the user device by initially authenticating the user device from the current user device signature of the user device and the current network latency of the user device along with a presentation of a user identity material, wherein the user identity material is sufficient to determine a user identity in the database.

14. The system of claim 9, wherein the method further comprises:
comparing the current network latency from the user device to the network latencies mapped in the database by geography, scheduling aspects for the network, and scheduling aspects for particular user devices; and
increasing confidence in the authentication if the current network latency from the geographic location of the user device accords with the network latency for the geographic location mapped in the database.

15. A non-transitory computer-readable medium comprising instructions which, in response to execution by a computer system, cause the computer system to perform a method comprising:
accessing a correspondence of a plurality of user device signatures based on network latency to user identities in a database;
comparing a geography information mapped to a user identity determined from a user identity material;
accessing a correspondence of a plurality of network latencies mapped by geography, by scheduling aspects for the network, and by scheduling aspects for particular user devices to user identities in the database;
comparing a current network latency of the user device to the plurality of network latencies mapped in the database by geography, the scheduling aspects for the network, and the scheduling aspects for particular user devices;
authenticating a user device from a current user device signature of the user device and the current network latency of the user device based on a correspondence of user device signatures to user identities in a database and the correspondence of the network latencies mapped by geography, by the scheduling aspects for the network, and by the scheduling aspects for particular user devices to user device signatures in the database; and
increasing a confidence in the authentication if the current network latency from a location of the user device is not substantially different from the network latency for the location mapped in the database by geography and the location of the user device is not substantially different from the geography information mapped in the database to the user identity determined from the user identity material.

16. The non-transitory computer-readable medium of claim 15, further comprising instructions which, in response to execution by the computer system, cause the computer system to perform:
constructing a correspondence of a plurality of user device signatures based on network latencies to user identities in a database, wherein a user device signature is based on a clock skew of the user device corrected for a network latency of a connection of the user device to a server.

17. The non-transitory computer-readable medium of claim 15, further comprising instructions which, in response to execution by the computer system, cause the computer system to perform:
constructing a correspondence of a plurality of network latencies mapped by geography, by the scheduling aspects for the network, and by the scheduling aspects for particular user devices to user identities in the database.

18. The non-transitory computer-readable medium of claim 15, further comprising instructions which, in response to execution by the computer system, cause the computer system to perform:
comparing the current network latency from the user device to the network latencies mapped in the database by geography, scheduling aspects for the network, and scheduling aspects for particular user devices; and
increasing confidence in the authentication if the current network latency from the geographic location of the user device accords with the network latency for the geographic location mapped in the database.

19. The non-transitory computer-readable medium of claim 15, further comprising instructions which, in response to execution by the computer system, cause the computer system to perform:
comparing a geography information mapped to the user identity determined from a user identity material; and
increasing a confidence in the authentication if the location of the user device accords with the geography information mapped in the database to the user identity determined from the user identity material.

20. The non-transitory computer-readable medium of claim 15, further comprising instructions which, in response to execution by the computer system, cause the computer system to perform:
initially authenticating the user device from the current user device signature of the user device and the current network latency of the user device along with a presentation of a user identity material.

* * * * *